(12) United States Patent
Leung

(10) Patent No.: US 9,075,565 B2
(45) Date of Patent: Jul. 7, 2015

(54) HARD DISC ENCLOSURE

(75) Inventor: Pak Shing Leung, Kwai Chung (CN)

(73) Assignee: Syba Tech Limited, Kwai Chung, Hong Kong (CN)

( * ) Notice: Subject to any disclaimer, the term of this patent is extended or adjusted under 35 U.S.C. 154(b) by 231 days.

(21) Appl. No.: 13/989,667

(22) PCT Filed: Dec. 6, 2011

(86) PCT No.: PCT/CN2011/083530
§ 371 (c)(1),
(2), (4) Date: May 24, 2013

(87) PCT Pub. No.: WO2012/075928
PCT Pub. Date: Jun. 14, 2012

(65) Prior Publication Data
US 2013/0258581 A1    Oct. 3, 2013

(30) Foreign Application Priority Data

Dec. 6, 2010    (GB) .................................... 1020626.6

(51) Int. Cl.
*G06F 1/16* (2006.01)
*G11B 33/12* (2006.01)
(Continued)

(52) U.S. Cl.
CPC ................ *G06F 1/16* (2013.01); *G11B 33/122* (2013.01); *G06F 1/20* (2013.01); *H05K 5/0213* (2013.01)

(58) Field of Classification Search
USPC ............ 312/9.12, 9.15, 405, 107, 319.1, 326, 312/334.47, 334.46, 607.17; 361/679.01, 361/679.33, 679.03, 679.48, 679.47, 361/679.37, 679.07, 679.21, 679.58, 361/679.43, 679.55, 679.57; 200/313, 600, 200/512, 5 A; 345/157, 440, 442, 1.3, 522, 345/569.2, 569.1, 473, 419, 594, 664, 177, 345/156, 174; 455/454, 297, 99, 1, 73, 59, 455/556.1, 3.06, 452.1, 566, 575.3, 575.4; 711/112, 113, 103, 170, 160, 154, 171, 711/135, 147, 161, 162
See application file for complete search history.

(56) References Cited

U.S. PATENT DOCUMENTS

| | | | |
|---|---|---|---|
| 6,922,739 B2 * | 7/2005 | Core ............................... | 710/22 |
| 2003/0090867 A1 | 5/2003 | Olson et al. | |

(Continued)

FOREIGN PATENT DOCUMENTS

| | | |
|---|---|---|
| CN | 201302824 Y | 2/2009 |
| CN | 201302824 | 9/2009 |

(Continued)

*Primary Examiner* — Hung Duong
(74) *Attorney, Agent, or Firm* — Price Heneveld LLP

(57) ABSTRACT

The invention describes a hard disc storage unit mounting comprising a housing having a foot; the housing comprising a plurality of upwardly extending side portions; a channel between the side portions; a support surface extending between the side portions at the bottom of the channel; one or more rear flanges, each flange extending inwardly from a respective side portion; an upwardly opening slot between the flanges or side portions at the rear of the support surface; the slot communicating with the channel; a controller unit comprising a base engaging surface, a forward facing surface and an upwardly facing connector surface; a connector extending upwardly from the connector surface and arranged to engage in use a socket of a hard disc storage unit; wherein the support surface and side portions are configured to securely engage and prevent rotation of the base engaging surface of the controller unit.

18 Claims, 2 Drawing Sheets

(51) Int. Cl.
*G06F 1/20* (2006.01)
*H05K 5/02* (2006.01)

(56) References Cited

U.S. PATENT DOCUMENTS

| 2004/0141253 | A1* | 7/2004 | Funawatari et al. ....... 360/97.01 |
| 2006/0133030 | A1 | 6/2006 | Takahashi et al. |
| 2006/0164753 | A1 | 7/2006 | Huang |
| 2007/0063379 | A1* | 3/2007 | Yuhara .......................... 264/259 |
| 2008/0024984 | A1 | 1/2008 | Lin |

FOREIGN PATENT DOCUMENTS

| CN | 101763884 | 6/2010 |
| CN | 101763884 A | 6/2010 |
| CN | 201607720 | 10/2010 |
| CN | 201607720 U | 10/2010 |
| CN | 201698318 | 1/2011 |
| GB | 2279816 | 11/1995 |
| KR | 200444987 | 6/2009 |

* cited by examiner

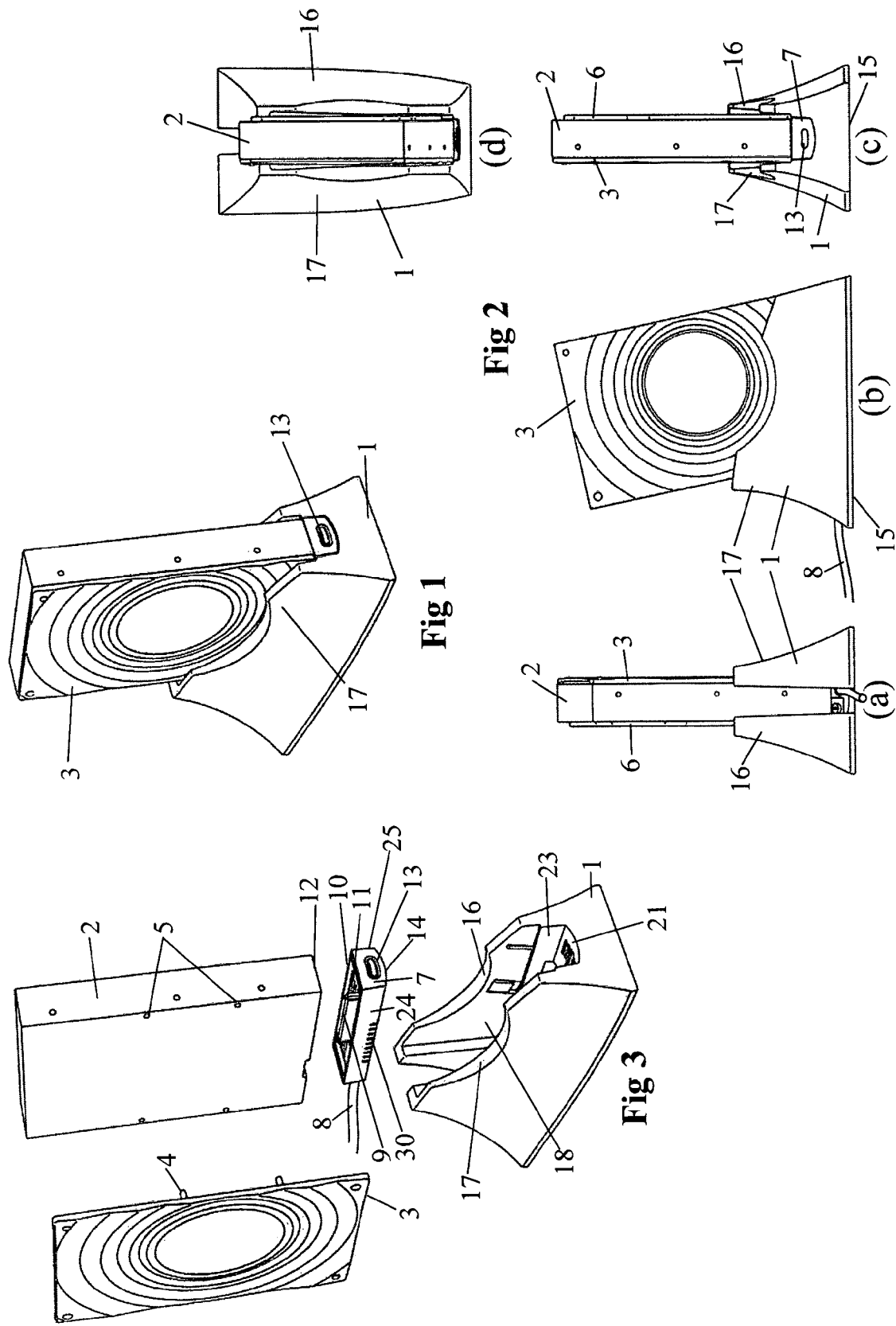

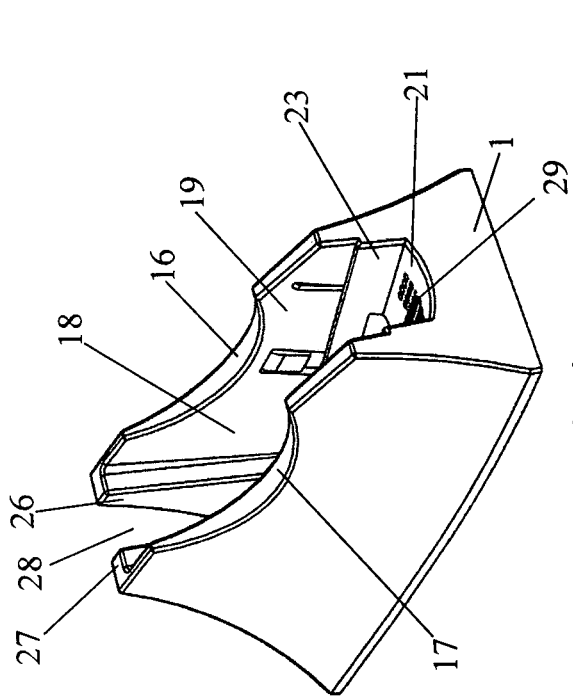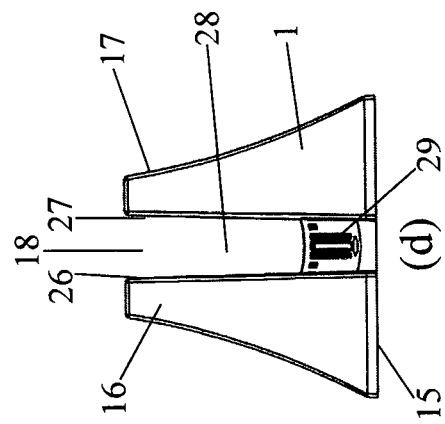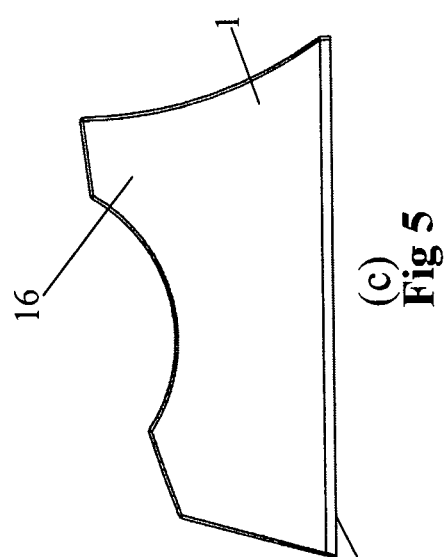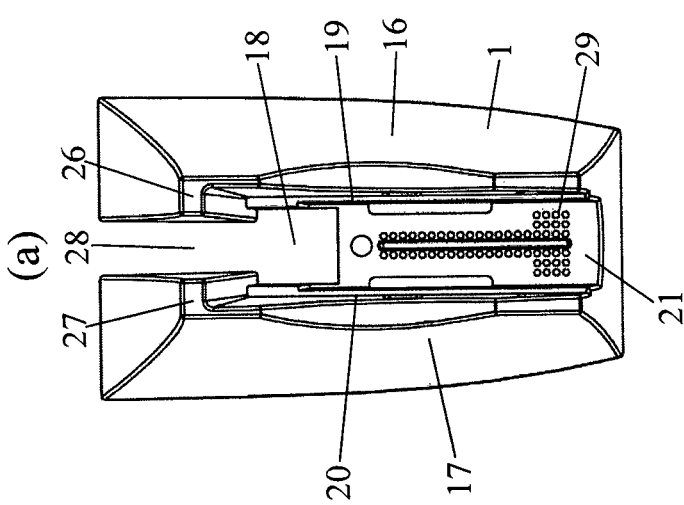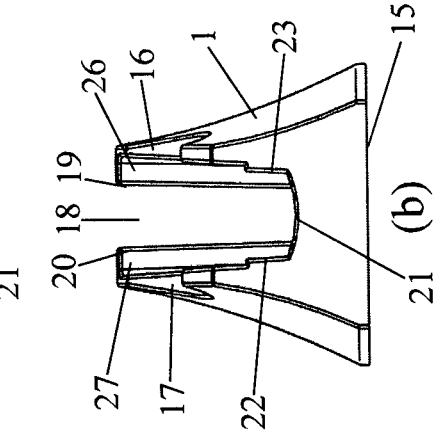

HARD DISC ENCLOSURE

CROSS-REFERENCE TO RELATED APPLICATIONS

This application is the National Stage of PCT International Application No. PCT/CN2011/083530 filed internationally on Dec. 6, 2011, which claims the benefit of Great Britain Application No. GB1020626.6 filed on Dec. 6, 2010.

FIELD OF THE INVENTION

This invention relates to a mounting for a hard disc storage unit, particularly but not exclusively to a free-standing mounting or enclosure which enables an internal hard disc storage unit to be mounted on a desk top or other horizontal surface.

BACKGROUND OF THE INVENTION

GB 2447142 discloses a hard disc enclosure comprising a sleeve having front and rear openings, two or more carrier plates adapted to engage sides of a hard disc storage unit, front and rear end members adapted to engage the front and rear openings, one of the front and rear members including a socket, a controller unit located adjacent the exterior of the member and releasably engageable with the socket, the controller unit including a connector adapted to connect a hard disc storage unit received within the casing with the controller unit further comprising a controller circuit and external connectors for connection to an external computer wherein the socket includes an aperture dimensioned to receive a connector plug of the controller, the aperture allowing the plug to pass through the end member to engage a hard disc storage unit within the enclosure.

SUMMARY OF THE INVENTION

According to the present invention a hard disc storage unit mounting comprises a housing having a front end, a rear end and a foot for mounting on a horizontal surface;
  the housing comprising a plurality of upwardly extending side portions;
  a rearwardly extending channel between the side portions;
  a concave base extending between the side portions at the bottom of the channel;
  one or more rear flanges, each flange extending inwardly from a respective side portion;
  a control unit comprising a base engaging surface, a forward facing surface and an upwardly facing connector surface;
  wherein the side portions and one or more flanges are dimensioned and configured to securely engage and prevent lateral or rotational movement of a hard drive unit connected to the control unit;
  a slot having an upward facing opening between the flanges or flange and side portion at the rear of the support surface;
  the slot communicating with the channel;
  wherein the base engaging surface slopes downwardly towards the rear;
  a connector extending upwardly from the connector surface and arranged to engage in use a socket of a hard disc storage unit;
  wherein the base and side portions are configured to securely engage and prevent rotation of the base engaging surface of the control unit; and
  wherein the support surface has an array of a multiplicity of first apertures, the base engaging surface having a corresponding array of second apertures communicating with the first apertures to permit circulation of air through the base to the control unit.

Preferably two flanges are provided, each extending inwardly from a respective side portion, a slot being formed between the flanges.

Preferably the control unit has a power cable and a data cable extending rearwardly through the slot between the flanges.

The base may comprise a support surface which may be concave and is preferably cylindrical to engage a complementarily shaped configuration of the base engaging surface of the controller unit. A cylindrical base support surface has the advantage that the assembly is self-centering.

The mounting or enclosure may further comprise one or more side panels adapted to be secured to the one or both sides of the hard disc mounting to form a protective and/or decorative cover or casing.

The invention provides several advantages. The weight of the hard disc unit acts downwardly on the controller unit and helps to provide and maintain a secure electrical and data connection to the controller unit without the need for a clip or fastener. Since the controller lies beneath the hard disc unit, the cables are located at a lower part of the housing adjacent and may extend from the unit in a direction parallel to the support surface.

The support surface has an array of a multiplicity of first apertures, the base engaging surface having a corresponding array of second apertures arranged when the unit is correctly located in the rear of the slot to communicate with the first apertures to permit circulation of air through the base to the interior of the controller unit. The upwardly facing connector surface may also include an array of third apertures communicating with the second apertures and being further configured to communicate with ventilation apertures of the hard disc storage unit. Such an arrangement provides a convenient passage for free circulation of air through the controller and hard disc storage unit in use. The edgewise mounting of the hard drive unit upon the controller unit and housing provides a convenient means for circulating cooling air through the assembly utilising heat generated within the units to create a convection current through the apparatus.

The casing for the hard drive unit may be mounted with a narrow side downwards to form an upwardly extending channel in the form of a chimney to facilitate circulation of cooling air from the lower apertures to upper apertures. Such an arrangement may avoid any need for a powered fan. The absence of fan driven circulation reduces any tendency for dust particles to be drawn into the unit during prolonged periods of use. In addition to a reduction in size, cost and power consumption the sizes of the apertures may be increased in comparison to fan cooled arrangements, further promoting efficient circulation of cooling air without increasing the risk of contamination.

Preferably the base engaging surface is inclined at an acute angle to the horizontal, for example between 5° and 30°, preferably between 10° and 45°, more preferably between 10° and 30°, most preferably between 10° and 20°. Use of a slot with an inclined base confers the advantage that the hard disc unit and controller unit may be easily located in the correct position at the lower end of the slot ensuring correct alignment of the arrays of ventilation apertures. The need for permanent fixing screws or clips is reduced. Also, the cables extending from the controller unit are directed downwardly towards the support surface, reducing the likelihood of the cables becoming untidy and creating a nuisance.

The slot may be provided with one or more inwardly facing resiliently deformable projections, dimensioned to engage the outer surfaces of the hard drive unit to secure the unit in the correct operating position at the rear of the slot. The projections may comprise polymeric or rubber feet.

The mounting may further comprise side panels having fixing lugs or projections arranged to be received in screw holes or other apertures in the exterior panels of the hard disc unit, the slot being dimensioned so that the hard disc unit with panels attached forms a secure fit preventing rotational movement of the unit in use.

The controller unit may have a forwardly directed face carrying one or more control switches, other actuators or display means, for example a back up button.

In a further embodiment of the invention, the controller unit may have laterally extending surfaces arranged to securely engage the side portions to prevent rotation of the control unit in use.

This arrangement has the advantage that hard disc units of various thicknesses may be employed. For example, conventional 2.5 inch or 3.5 inch hard disc units may be mounted in the same device without the need for a spacer or other support for the smaller unit.

The mounting of the present invention provides a secure and reliable mounting for a hard disc unit with ease of assembly or dismantling for repair or replacement.

These and other features, advantages, and objects of the present invention will be further understood and appreciated by those skilled in the art by reference to the following specification, claims, and appended drawings.

BRIEF DESCRIPTION OF THE DRAWINGS

The invention is further described by means of example, but not in any limitative sense, with reference to the accompanying drawings, of which:

FIG. 1 is a perspective view of an assembly in accordance with the invention;

FIG. 2 comprises side and end elevations and a plan view of the assembly shown in FIG. 1;

FIG. 3 is an exploded view of the assembly shown in FIGS. 1 and 2;

FIG. 4 shows the base unit of the assembly and;

FIG. 5 comprises side and end elevations and a plan view of the base unit shown in FIG. 4.

DETAILED DESCRIPTION OF THE INVENTION

The hard disc mounting shown in the Figures comprises a base part (1) of the housing into which a 3.5 inch hard disc storage unit (2) may be mounted edgewise on the narrow edge thereof. A side panel (3) is engaged with the side of the unit (2) by means of lugs (4) extending into screwholes (5) contained in the hard disc storage unit casing. A SAT adaptor or controller unit (7) having a power/data cable (8) and upwardly extending connector (9) is engaged to the narrow edge of the lower surface of the hard disc unit (2).

The controller unit (7) has an upwardly extending connector surface (10) from which the connector (9) extends. The connector surface (10) has an array of apertures (11) arranged to communicate with ventilation apertures (not shown) in the lower narrow edge (12) of the hard disc unit (2). A back up button (13) is provided in the forward facing surface of the controller unit (7). The downwardly facing surface (14) of the controller unit (7) has a cylindrical convex configuration and is provided with an array of ventilation apertures (30) communicating with the apertures (11).

The base (1) comprises a lower, support surface engaging foot (15), arranged to engage a horizontal or otherwise level support surface, by means of which the housing may be placed on a desk, shelf or other work surface. Two side portions (16,17) extend upwardly from the housing (1) and form a channel (18) having inwardly facing walls (19,20) separated by a distance selected to receive the hard disc storage unit (2), engaging the side panel (3) and the casing (6) of the unit (2), while preventing lateral movement or rotation in use.

A base or support surface (21) has a cylindrically concave configuration to receive the convex base engaging surface (14) of the controller unit (7). Side walls (22,23) at the lower portion of the channel (18), adjacent the support surface (21), are dimensioned to receive the side walls (24,25) of the controller unit (7). In this way, lateral movement or rotation of the controller unit (7) casing (6) and panel (3) is prevented independent of any restraint applied to the casing (6) and panel (3).

The base or support surface (21) slopes downwardly from the forward to backward ends of the housing (1). A pair of flanges (26,27) extend inwardly from the side portions (16, 17). A slot (28) between the flanges (26,27) communicates with the channel (18) so that a cable extending from the controller unit may pass from the rear of the apparatus along the surface of a desk on which the unit is standing.

The base or support surface (21) is provided with an array of apertures (29) as shown in FIGS. 4 and 5. When the hard drive unit and controller are correctly positioned in the rear, lower part of the slot, the apertures (29) communicate with apertures (30) and thereby with apertures (11) of the controller providing ventilation to ventilation ports (not shown) on the lower edge (12) of the hard disc unit (2). Thermal convection caused by heat generated within the hard disc unit (2) causes an upward current of air to circulate through apertures (29), apertures (30), apertures (11) and through the unit (2) to maintain an optimum working temperature within the unit.

The invention claimed is:

1. A hard disc storage unit mounting comprising a housing having a front end, a rear end and a foot for mounting on a horizontal surface;

the housing comprising a plurality of upwardly extending side portions;

a rearwardly extending channel between the side portions;

a concave base extending between the side portions at the bottom of the channel;

one or more rear flanges, each flange extending inwardly from a respective side portion;

a control unit comprising a base engaging surface, a forward facing surface and an upwardly facing connector surface;

wherein the side portions and one or more flanges are dimensioned and configured to securely engage and prevent lateral or rotational movement of a hard drive unit connected to the control unit;

a slot having an upward facing opening between the flanges or flange and side portion at the rear of the support surface;

the slot communicating with the channel;

wherein the base engaging surface slopes downwardly towards the rear;

a connector extending upwardly from the connector surface and arranged to engage in use a socket of a hard disc storage unit;

wherein the support surface and side portions are configured to securely engage and prevent rotation of the base engaging surface of the control unit; and wherein the support surface has an array of a multiplicity of first apertures, the base engaging surface having a corresponding array of second apertures communicating with the first apertures to permit circulation of air through the base to the control unit.

2. The hard disc storage unit mounting of claim 1, wherein two flanges each extend inwardly from a respective side portion, a slot being formed between the flanges.

3. The hard disc storage unit mounting of claim 2, wherein the support surface is cylindrical.

4. The hard disc storage unit mounting of claim 3 further comprising a side panel adapted to be secured to a side of the hard disc mounting.

5. The hard disc storage unit mounting of claim 2 further comprising a side panel adapted to be secured to a side of the hard disc mounting.

6. The hard disc storage unit mounting of claim 2, wherein the upwardly facing connector surface includes an array of third apertures communicating with the second apertures and being further configured to communicate with ventilation apertures of the hard disc storage unit.

7. The hard disc storage unit mounting of claim 1, wherein the support surface is cylindrical.

8. The hard disc storage unit mounting of claim 7 further comprising a side panel adapted to be secured to a side of the hard disc mounting.

9. The hard disc storage unit mounting of claim 1 further comprising a side panel adapted to be secured to a side of the hard disc mounting.

10. The hard disc storage unit mounting of claim 9 further comprising a multiplicity of lugs or projections extending from the side panel for engagement in apertures in the hard disc unit.

11. The hard disc storage unit mounting of claim 10, wherein the upwardly facing connector surface includes an array of third apertures communicating with the second apertures and being further configured to communicate with ventilation apertures of the hard disc storage unit.

12. The hard disc storage unit mounting of claim 9, wherein the upwardly facing connector surface includes an array of third apertures communicating with the second apertures and being further configured to communicate with ventilation apertures of the hard disc storage unit.

13. The hard disc storage unit mounting of claim 9, wherein the control unit has laterally extending surfaces arranged to securely engage the side portions to prevent rotation of the control unit.

14. The hard disc storage unit mounting of claim 1, wherein the upwardly facing connector surface includes an array of third apertures communicating with the second apertures and being further configured to communicate with ventilation apertures of the hard disc storage unit.

15. The hard disc storage unit mounting of claim 14, wherein the control unit has laterally extending surfaces arranged to securely engage the side portions to prevent rotation of the control unit.

16. The hard disc storage unit mounting of claim 1, wherein the control unit has laterally extending surfaces arranged to securely engage the side portions to prevent rotation of the control unit.

17. A hard disc storage unit mounting comprising a housing having a front end, a rear end and a foot for mounting on a horizontal surface;

the housing comprising a plurality of upwardly extending side portions;

a rearwardly extending channel between the side portions;

a concave base extending between the side portions at the bottom of the channel;

one or more rear flanges, each flange extending inwardly from a respective side portion;

a control unit comprising a base engaging surface, a forward facing surface and an upwardly facing connector surface;

wherein the side portions and one or more flanges are dimensioned and configured to securely engage and prevent lateral and rotational movement of a hard drive unit connected to the control unit;

a slot having an upward facing opening between the flanges or flange and side portion at the rear of the support surface; and communicating with the channel;

wherein the base engaging surface slopes downwardly towards the rear;

a connector extending upwardly from the connector surface and arranged to engage in use a socket of a hard disc storage unit;

wherein the support surface and side portions are configured to securely engage and prevent rotation of the base engaging surface of the control unit;

wherein the support surface has an array of a multiplicity of first apertures, the base engaging surface having a corresponding array of second apertures communicating with the first apertures to permit circulation of air through the base to the control unit;

wherein two flanges each extend inwardly from a respective side portion, a slot being formed between the flanges;

wherein the support surface is cylindrical;

wherein the hard disc storage mounting further comprises a side panel adapted to be secured to a side of the hard disc mounting and a multiplicity of lugs or projections extending from the side panel for engagement in apertures in the hard disc unit;

wherein the upwardly facing connector surface includes an array of third apertures communicating with the second apertures and being further configured to communicate with ventilation apertures of the hard disc storage unit; and wherein the control unit has laterally extending surfaces arranged to securely engage the side portions to prevent rotation of the control unit.

18. A hard disc storage unit mounting comprising a housing having a front end, a rear end and a foot for mounting on a horizontal surface;

the housing comprising a plurality of upwardly extending side portions;

a rearwardly extending channel between the side portions;

a concave base extending between the side portions at the bottom of the channel;

one or more rear flanges, each flange extending inwardly from a respective side portion;

a control unit comprising a base engaging surface, a forward facing surface and an upwardly facing connector surface;

wherein the side portions and one or more flanges are dimensioned and configured to securely engage and prevent lateral and rotational movement of a hard drive unit connected to the control unit;

a slot having an upward facing opening between the flanges or flange and side portion at the rear of the support surface; and
communicating with the channel;
wherein the base engaging surface slopes downwardly towards the rear;
a connector extending upwardly from the connector surface and arranged to engage in use a socket of a hard disc storage unit;
wherein the support surface and side portions are configured to securely engage and prevent rotation of the base engaging surface of the control unit;
wherein the support surface has an array of a multiplicity of first apertures, the base engaging surface having a corresponding array of second apertures communicating with the first apertures to permit circulation of air through the base to the control unit;
wherein the support surface is cylindrical;
wherein the hard disc storage mounting further comprises a side panel adapted to be secured to a side of the hard disc mounting and a multiplicity of lugs or projections extending from the side panel for engagement in apertures in the hard disc unit;
wherein the upwardly facing connector surface includes an array of third apertures communicating with the second apertures and being further configured to communicate with ventilation apertures of the hard disc storage unit; and
wherein the control unit has laterally extending surfaces arranged to securely engage the side portions to prevent rotation of the control unit.

\* \* \* \* \*